(12) United States Patent
Fowee

(10) Patent No.: US 6,587,753 B2
(45) Date of Patent: *Jul. 1, 2003

(54) USE OF CONTROL MATRIX FOR BOILER CONTROL

(75) Inventor: Roger W. Fowee, Wheaton, IL (US)

(73) Assignee: Ondeo Nalco Company, Naperville, IL (US)

( * ) Notice: Subject to any disclaimer, the term of this patent is extended or adjusted under 35 U.S.C. 154(b) by 291 days.

This patent is subject to a terminal disclaimer.

(21) Appl. No.: 09/737,257

(22) Filed: Dec. 13, 2000

(65) Prior Publication Data

US 2001/0047221 A1 Nov. 29, 2001

Related U.S. Application Data

(63) Continuation-in-part of application No. 09/563,085, filed on May 1, 2000, now Pat. No. 6,336,058.

(51) Int. Cl.$^7$ .................. G05B 21/00; G01N 35/08; C02F 1/00
(52) U.S. Cl. .................. 700/266; 700/274; 436/55; 210/698; 210/696
(58) Field of Search ................. 700/266, 274; 205/775; 436/55; 422/3, 11, 18, 224, 244; 210/696.8

(56) References Cited

U.S. PATENT DOCUMENTS

| | | |
|---|---|---|
| 4,288,327 A | 9/1981 | Godlewski et al. |
| 4,457,847 A | 7/1984 | Lorenc et al. |
| 5,041,386 A | 8/1991 | Pierce et al. |
| 5,282,379 A | 2/1994 | Harder et al. |
| 5,320,967 A | 6/1994 | Avallone et al. |
| 5,527,468 A | 6/1996 | Boyette et al. |
| 5,736,405 A | 4/1998 | Alfano et al. |
| 6,068,012 A | 5/2000 | Beardwood et al. |

Primary Examiner—Leo Picard
Assistant Examiner—Walter R. Swindell
(74) Attorney, Agent, or Firm—Margaret M. Brumm; Thomas M. Breininger

(57) ABSTRACT

Described and claimed is a method of controlling a boiler in which control is based on information from a control Matrix applicable to the specific operating parameters of said boiler. This method is applicable for boilers being treated with any of several standard boiler treatment programs. By conducting the instant claimed method it is possible to automatically control a boiler using at least one fluorometer and one or more analytical devices and a controller.

7 Claims, 13 Drawing Sheets

**Matrix for a Polymer Based All-in-One Product
(with scavenger and condensate corrosion inhibitor)**

| | | | TREATMENT ACTIVES CONSUMPTION | | |
|---|---|---|---|---|---|
| Item | Condition | Detrimental Effect Produced | BD Polymer | FW Scavenger | Condensate Corrosion |
| A | Loss of Product Feed (or increase in steam load) | scale & corrosion | 1 | 1 | 1 |
| B | Overfeed of Product (or decrease in steam load) | corrosion | 0 | 0 | 0 |
| C | Low Cycles of Concentration | waste of BD energy & water | -1 | 0 | 0/-1 |
| D | High Cycles of Concentration | scale | 1 | 0 | 0 |
| E | Increase dissolved oxygen <50 ppb | corrosion | 0 | 1 | 0 |
| F | Increased dissolved oxygen > 50 -100 ppb | corrosion & scale | 1 | 1 | 0 |
| G | Increased carbonate loading in FW | condensate corrosion | 0 | 0 | 1 |
| H | Increased particulate loading in FW | scale | 1 | 0 | 0 |
| I | Process leak (non-hardness) | scale | 1 | 0? | 0? |
| J | Process leak | corrosion | 0? | 0? | 1 |
| K | Boiler Foaming or Carry-Over | deposits on turbine/super heater | 0 | 0 | 0 |
| L | Excessive hardness in FW (leak) | scale | 1 | 0 | 0 |
| Z | Performance as Expected / Desired | none | 0 | 0 | 0 |

? - although generally no change should be noticed, certain types of events may cause a positive or negative change in actives consumption

FIG. 1A

Matrix for a Polymer Based All-in-One Product
(with scavenger and condensate corrosion inhibitor)

| Item | Condition | Detrimental Effect Produced | TREATMENT ACTIVES CONSUMPTION | | |
|---|---|---|---|---|---|
| | | | BD Polymer | FW Scavenger | Condensate Corrosion |
| A | Loss of Product Feed (or increase in steam load) | scale & corrosion | 1 | 1 | 1 |
| B | Overfeed of Product (or decrease in steam load) | corrosion | 0 | 0 | 0 |
| C | Low Cycles of Concentration | waste of BD energy & water | -1 | 0 | 0/-1 |
| D | High Cycles of Concentration | scale | 1 | 0 | 0 |
| E | Increase dissolved oxygen <50 ppb | corrosion | 0 | 1 | 0 |
| F | Increased dissolved oxygen > 50 - 100 ppb | corrosion & scale | 1 | 1 | 0 |
| G | Increased carbonate loading in FW | condensate corrosion | 0 | 0 | 1 |
| H | Increased particulate loading in FW | scale | 1 | 0 | 0 |
| I | Process leak (non-hardness) | scale | 1 | 0? | 0? |
| J | Process leak | corrosion | 0? | 0? | 1 |
| K | Boiler Foaming or Carry-Over | deposits on turbine/super heater | 0 | 0 | 0 |
| L | Excessive hardness in FW (leak) | scale | 1 | 0 | 0 |
| Z | Performance as Expected / Desired | none | 0 | 0 | 0 |

? - although generally no change should be noticed, certain types of events may cause a positive or negative change in actives consumption

FIG. 1B

Matrix for a Polymer Based All-in-One Product
(with scavenger and condensate corrosion inhibitor)

| Item | Corrective Action(s) | Feedwater Classic tracer | Boiler water Classic tracer | Condensate Classic tracer |
|---|---|---|---|---|
| A | increase treatment dose, fix pump, fill tank with treatment, fix control equip. if necessary | decrease | decrease$^2$ | 0* |
| B | decrease treatment dose | increase | increase$^2$ | 0** |
| C | decrease blowdown mass flow rate | decrease$^1$ | decrease$^2$ | 0* |
| D | increase blowdown mass flow rate | increase$^1$ | increase$^2$ | 0** |
| E | fix air inleakage (pump, deaerator, condensate) and/or increase treatment dosage | 0 | 0 | 0 |
| F | fix air inleakage, feed supplemental scavenger, or increase treatment dose | 0 | 0 | 0 |
| G | fix air inleakage to condensate, vent condensate, dump condensate | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 1 |
| K | decrease boiler water level, increase blowdown | 0 | 0 | 0 |
| L | increase treatment dose, eliminate leak, fix pre-treatment process | 0 | 0 | 0 |
| Z | | n/a | | |

\* if carry-over exists - under this condition condensate classic tracer concentration will decrease
\*\* if carry-over exists - under this condition condensate classic tracer concentration will increase
$^1$ assumes manual treatment pump setting - no automatic control - with control no change in concentration expected
$^2$ assumes manual control of blowdown mass flow - no automatic control - with control no change in concentration expected
? - although generally no change should be noticed, certain types of events may cause a positive or negative change in actives consumption

FIG. 2A

Matrix for a Residual Phosphate Polymer Product with Scavenger and Condensate Corrosion Inhibitor Fed Separately

| Item | Condition | Detrimental Effect Produced | BD Polymer | FW Scavenger | Condensate Corrosion | BD Phosphate |
|---|---|---|---|---|---|---|
| A | Loss of Product Feed (or increase in steam load) | scale & corrosion | 1 | 0 | 0 | 1 |
| B | Overfeed of Product (or decrease in steam load) | corrosion (due to excess polymer) | 0 | 0 | 0 | 0 |
| C | Low Cycles | waste of BD energy & water | -1 | 0 | 0/-1 | 0 |
| D | High Cycles | scale | 1 | 0 | 0 | 0 |
| E | Increase dissolved oxygen <50 ppb | corrosion | 0 | 1 | 0 | 0 |
| F | Increased dissolved oxygen >50 -100 ppb | corrosion & scale | 1 | 1 | 0 | 0 |
| G | Increased carbonate loading in FW | condensate corrosion | 0 | 0 | 1 | 0/1? |
| H | Increased particulate loading in FW | scale | 1 | 0 | 0 | 0 |
| I | Process leak (non-hardness) | scale | 1 | 0? | 0? | 1 |
| J | Process leak | corrosion | 0? | 0? | 1 | 1 |
| K | Boiler Foaming or Carry-Over | deposits on turbine/super heater | 0 | 0 | 0 | 0 |
| L | Excessive hardness in FW (leak) | scale | 1 | 0 | 0 | 1 |
| Z | Performance as Expected / Desired | none | 0 | 0 | 0 | 0 |

? - although generally no change should be noticed, certain types of events may cause a positive or negative change in actives consumption

FIG. 2B

Matrix for a Residual Phosphate Polymer Product with Scavenger and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase pump rate, fix pump, fill tank with treatment, fix control equip. if necessary | decrease | decrease² | 0* |
| B | decrease pump rate | increase | increase² | 0** |
| C | decrease blowdown rate | decrease¹ | decrease² | 0* |
| D | increase blowdown | increase¹ | increase² | 0** |
| E | fix air inleakage (pump, deaerator, condensate) and/or increase dosage | 0 | 0 | 0 |
| F | fix air inleakage, feed supplemental scavenger, or increase all-in-one dose | 0 | 0 | 0 |
| G | air inleakage to condensate, vent condensate, increase condensate treatment dosage | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 1 |
| K | decrease boiler water level, increase blowdown | 0 | 0 | 0 |
| L | increase phosphate/polymer treatment dose, eliminate leak, fix pre-treatment process | 0 | 0 | 0 |
| N | | n/a | 0 | 0 |

\* if carry-over exists - under this condition condensate classic tracer concentration will decrease
\*\* if carry-over exists - under this condition condensate classic tracer concentration will increase
¹ assumes manual treatment pump setting - no automatic control - with control no change in concentration expected
² assumes manual control of blowdown mass flow - no automatic control - with control no change in concentration expected
? - although generally no change should be noticed, certain types of events may cause a positive or negative change in actives consumption

FIG. 3A

Matrix for a pH/Phosphate Product with Polymer, Scavenger, and Condensate Corrosion Inhibitor Fed Separately

| | | | TREATMENT ACTIVES CONSUMPTION | | | |
|---|---|---|---|---|---|---|
| Item | Condition | Detrimental Effect Produced | BD Polymer | FW Scavenger | Condensate Corrosion | BD Phosphate |
| A | Loss of Product Feed (or increase in steam load) | scale & corrosion | 0 | 0 | 0 | 1 |
| B | Overfeed of Product (or decrease in steam load) | corrosion (due to excess polymer) | 0 | 0 | 0 | 0 |
| C | Low Cycles | waste of BD energy & water | -1 | 0 | 0 | 0 |
| D | High Cycles | scale | 1 | 0 | 0 | 0 |
| E | Increase dissolved oxygen <50 ppb | corrosion | 0 | 1 | 0 | 0 |
| F | Increased dissolved oxygen >50 -100 ppb | corrosion & scale | 1 | 1 | 0 | 0 |
| G | Increased carbonate loading in FW | condensate corrosion | 0 | 0 | 0/1? | 0/1? |
| H | Increased particulate loading in FW | scale | 1 | 0 | 0 | 0 |
| I | Process leak (non-hardness) | scale | 1 | 0? | 1 | 1 |
| J | Process leak | corrosion | 0? | 0? | 1 | 1 |
| K | Boiler Foaming or Carry-Over | deposits on turbine/super heater | 0 | 0 | 0 | 0 |
| L | Excessive hardness in FW (leak) | scale | 1 | 0 | 1 | 1 |
| M | Phosphate Hideout | corrosion | 0 | 0 | 1 | 1 |
| Z | Performance as Expected / Desired | none | 0 | 0 | 0 | 0 |

? - although generally no change should be noticed, certain types of events may cause a positive or negative change in actives consumption

FIG. 3B

Matrix for a pH/Phosphate Product with Polymer, Scavenger, and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase pump rate, fix pump, fill tank with treatment, fix control equip. if necessary | decrease | decrease$^2$ | 0* |
| B | decrease pump rate | increase | increase$^2$ | 0** |
| C | decrease blowdown rate | decrease$^1$ | decrease$^2$ | 0* |
| D | increase blowdown | increase$^1$ | increase$^2$ | 0** |
| E | fix air inleakage (pump, deaerator, condensate) and/or increase dosage | 0 | 0 | 0 |
| F | fix air inleakage, feed supplemental scavenger, or increase all-in-one dose | 0 | 0 | 0 |
| G | fix air inleakage to condensate, vent condensate, increase condensate treatment dosage | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 0 |
| K | decrease boiler water level, increase blowdown | 0 | 0 | 1 |
| L | increase phosphate/polymer treatment dose, eliminate leak, fix pre-treatment process | 0 | 0 | 0 |
| M | do nothing to phosphate treatment feed, verify no hardness leak to FW | 0 | 0 | 0 |
| N | | 0 | 0 | 0 |

\* if carry-over exists -under this condition condensate classic tracer concentration will decrease
\*\* if carry-over exists -under this condition condensate classic tracer concentration will increase
$^1$ assumes manual treatment pump setting - no automatic control - with control no change in concentration expected
$^2$ assumes manual control of blowdown mass flow - no automatic control - with control no change in concentration expected
? - although generally no change should be noticed, certain types of events may cause a positive or negative change in actives consumption

FIG. 4A

Matrix for an All-Polymer Product with Scavenger and Condensate Corrosion Inhibitor Fed Separately

| Item | Condition | Detrimental Effect Produced | TREATMENT ACTIVES CONSUMPTION | | |
|---|---|---|---|---|---|
| | | | BD Polymer | FW Scavenger | Condensate Corrosion |
| A | Loss of Product Feed (or increase in steam load) | scale & corrosion | 1 | 0 | 0 |
| B | Overfeed of Product (or decrease in steam load) | corrosion | 0 | 0 | 0 |
| C | Low Cycles of Concentration | waste of BD energy & water | -1 | 0 | 0/-1 |
| D | High Cycles of Concentration | scale | 1 | 0 | 0 |
| E | Increase dissolved oxygen <50 ppb | corrosion | 0 | 1 | 0 |
| F | Increased dissolved oxygen > 50 -100 ppb | corrosion & scale | 1 | 1 | 0 |
| G | Increased carbonate loading in FW | condensate corrosion | 0 | 0 | 1 |
| H | Increased particulate loading in FW | scale | 1 | 0 | 0 |
| I | Process leak (non-hardness) | scale | 1 | 0? | 0? |
| J | Process leak | corrosion | 0? | 0? | 1 |
| K | Boiler Foaming or Carry-Over | deposits on turbine/super heater | 0 | 0 | 0 |
| L | Excessive hardness in FW (leak) | scale | 1 | 0 | 0 |
| Z | Performance as Expected / Desired | none | 0 | 0 | 0 |

? - although generally no change should be noticed, certain types of events may cause a positive or negative change in actives consumption

FIG. 4B

Matrix for an All-Polymer Product with Scavenger and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase treatment dose, fix pump, fill tank with treatment, fix control equip. if necessary | decrease | decrease$^2$ | 0* |
| B | decrease treatment dose | increase | increase$^2$ | 0** |
| C | decrease blowdown mass flow rate | decrease$^1$ | decrease$^2$ | 0* |
| D | increase blowdown mass flow rate | increase$^1$ | increase$^2$ | 0** |
| E | fix air inleakage (pump, deaerator, condensate) and/or increase treatment dosage | 0 | 0 | 0 |
| F | fix air inleakage, feed supplemental scavenger, or increase treatment dose | 0 | 0 | 0 |
| G | fix air inleakage to condensate, vent condensate, dump condensate | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | ? |
| K | decrease boiler water level, increase blowdown | 0 | 0 | 0 |
| L | increase treatment dose, eliminate leak, fix pre-treatment process | 0 | 0 | 0 |
| Z | n/a | | | |

\* if carry-over exists -under this condition condensate classic tracer concentration will decrease
\*\* if carry-over exists -under this condition condensate classic tracer concentration will increase
$^1$ assumes manual treatment pump setting - no automatic control - with control no change in concentration expected
$^2$ assumes manual control of blowdown mass flow - no automatic control - with control no change in concentration expected
? - although generally no change should be noticed, certain types of events may cause a positive or negative change in actives consumption

FIG. 5A

Matrix for a pH/Phosphate Polymer Product with Scavenger and Condensate Corrosion Inhibitor Fed Separately

| Item | Condition | Detrimental Effect Produced | BD Polymer | FW Scavenger | Condensate Corrosion | BD Phosphate |
|---|---|---|---|---|---|---|
| A | Loss of Product Feed (or increase in steam load) | scale & corrosion | 1 | 0 | 0 | 1 |
| B | Overfeed of Product (or decrease in steam load) | corrosion (due to excess polymer) | 0 | 0 | 0 | 0 |
| C | Low Cycles | waste of BD energy & water | -1 | 0 | 0 | 0 |
| D | High Cycles | scale | 1 | 0 | 0 | 0 |
| E | Increase dissolved oxygen <50 ppb | corrosion | 0 | 1 | 0 | 0 |
| F | Increased dissolved oxygen >50 -100 ppb | corrosion & scale | 1 | 1 | 0 | 0 |
| G | Increased carbonate loading in FW | condensate corrosion | 0 | 0 | 0/1? | 0/1? |
| H | Increased particulate loading in FW | scale | 1 | 0 | 0 | 0 |
| I | Process leak (non-hardness) | scale | 1 | 0? | 1 | 1 |
| J | Process leak | corrosion | 0? | 0? | 1 | 1 |
| K | Boiler Foaming or Carry-Over | deposits on turbine/super heater | 0 | 0 | 0 | 0 |
| L | Excessive hardness in FW (leak) | scale | 1 | 0 | 1 | 1 |
| M | Phosphate Hideout | corrosion | 0 | 0 | 0 | 1 |
| N | Performance as Expected / Desired | none | 0 | 0 | 0 | 0 |

? - although generally no change should be noticed, certain types of events may cause a positive or negative change in actives consumption

FIG. 5B

Matrix for a pH/Phosphate Polymer Product with Scavenger and Condensate Corrosion Inhibitor Fed Separately

| Item | Corrective Action(s) | Feedwater Classic tracer | Boiler water Classic tracer | Condensate Classic tracer |
|---|---|---|---|---|
| A | increase pump rate, fix pump, fill tank with treatment, fix control equip. if necessary | decrease | decrease² | 0* |
| B | decrease pump rate | increase | increase² | 0** |
| C | decrease blowdown rate | decrease¹ | decrease² | 0* |
| D | increase blowdown | increase¹ | increase² | 0** |
| E | fix air inleakage (pump, deaerator, condensate) and/or increase dosage | 0 | 0 | 0 |
| F | fix air inleakage, feed supplemental scavenger, or increase all-in-one dose | 0 | 0 | 0 |
| G | fix air inleakage to condensate, vent condensate, increase condensate treatment dosage | 0 | 0 | 0 |
| H | dump condensate, increase treatment dose, increase blowdown | 0 | 0 | 0 |
| I | increase treatment dose, eliminate leak | 0 | 0 | 0 |
| J | increase treatment dose, eliminate leak | 0 | 0 | 0 |
| K | decrease boiler water level, increase blowdown | 0 | 0 | 1 |
| L | increase phosphate/polymer treatment dose, eliminate leak, fix pre-treatment process | 0 | 0 | 0 |
| M | do nothing to phosphate treatment feed, verify no hardness leak to FW | 0 | 0 | 0 |
| N | | n/a | | |

\* if carry-over exists - under this condition condensate classic tracer concentration will decrease
\** if carry-over exists - under this condition condensate classic tracer concentration will increase
¹ assumes manual treatment pump setting - no automatic control - with control no change in concentration expected
² assumes manual control of blowdown mass flow - no automatic control - with control no change in concentration expected
? - although generally no change should be noticed, certain types of events may cause a positive or negative change in actives consumption

FIG. 6A

Matrix for a Polymer Based All-In-One product (with (Gallic Acid) Scavenger and Condensate Corrosion Inhibitor Fed Separately)

| Item | Condition | Detrimental Effect Produced | BD Polymer | FW Scavenger | Condensate Corrosion |
|---|---|---|---|---|---|
| A | Loss of Product Feed (or increase in steam load) | scale & corrosion | 1 | 0 | 0 |
| B | Overfeed of Product (or decrease in steam load) | corrosion | 0 | 0 | 0 |
| C | Low Cycles of Concentration | waste of BD energy & water | -1 | 0 | 0/-1 |
| D | High Cycles of Concentration | scale | 1 | 0 | 0 |
| E | Increase dissolved oxygen <50 ppb | corrosion | 0 | 1 | 0 |
| F | Increased dissolved oxygen > 50 -100 ppb | corrosion & scale | 1 | 1 | 1 |
| G | Increased carbonate loading in FW | condensate corrosion | 0 | 0 | 0 |
| H | Increased particulate loading in FW | scale | 1 | 0 | 0? |
| I | Process leak (non-hardness) | scale | 1 | 0? | 0? |
| J | Process leak | corrosion | 0? | 0? | 1 |
| K | Boiler Foaming or Carry-Over | deposits on turbine/super heater | 0 | 0 | 0 |
| L | Excessive hardness in FW (leak) | scale | 1 | 0 | 0 |
| M | Increased gallic acid product usage | increased cost | 0 | 1[1] | 0 |
| N | Increased gallic acid oxidized product concentration | cost, corrosion | 0 | 1[1] | 0 |
| Z | Performance as Expected / Desired | none | 0 | 0 | 0 |

TREATMENT ACTIVES CONSUMPTION

? - although generally no change should be noticed, certain types of events may cause a positive or negative change in actives consumption

FIG. 6B

| Item | Corrective Action(s) | Feedwater Classic tracer | Boiler water Classic tracer | Condensate Classic tracer | Feedwater Gallate |
|---|---|---|---|---|---|
| A | increase treatment dose, fix pump, fill tank with treatment, fix control equip. if necessary | decrease | decrease$^3$ | 0* | decrease |
| B | decrease treatment dose | increase | increase$^3$ | 0** | ? |
| C | decrease blowdown mass flow rate | decrease$^2$ | decrease$^3$ | 0* | 0$^1$ |
| D | increase blowdown mass flow rate | increase$^2$ | increase$^3$ | 0** | 0$^1$ |
| E | fix air inleakage (pump, deaerator, condensate) and/or increase treatment dosage | 0 | 0 | 0 | 0$^1$ |
| F | fix air inleakage, feed supplemental scavenger, or increase treatment dose | 0 | 0 | 0 | 0 |
| G | fix air inleakage to condensate, vent condensate, dump condensate | 0 | 0 | 0 | 0 |
| H | dump condensate, increase treatment dose, increase blowdown | 0 | 0 | 0 | 0 |
| I | increase treatment dose, eliminate leak | 0 | 0 | 0 | 0 |
| J | increase treatment dose, eliminate leak | 0 | 0 | 0 | 0 |
| K | decrease boiler water level, increase blowdown | 0 | 0 | 1 | 0 |
| L | increase treatment dose, eliminate leak, fix pre-treatment process | 0 | 0 | 0 | 0 |
| M | fix air inleakage (pump, deaerator, condensate) | 0 | 0 | 0 | 0$^1$ |
| N | fix air inleakage (pump, deaerator, condensate) | 0 | 0 | 0 | 0 |
| Z | | n/a | | | |

? - although generally no change should be noticed, certain types of events may cause a positive or negative change in actives consumption
* if carry-over exists -under this condition condensate classic tracer concentration will decrease
** if carry-over exists -under this condition condensate classic tracer concentration will increase
$^1$ scavenger consumption occurs but feedwater concentrations are compensated using online dosage control
$^2$ assumes manual treatment pump setting - no automatic control - with control no change in concentration expected
$^3$ assumes manual control of blowdown mass flow - no automatic control - with control no change in concentration expected

FIG. 7

Gallic Acid Product Consumption/Usage Increase
Additional Measurements

| Item | Condition | Treatment Actives Consumption | | | Additional Measurements | | | |
|---|---|---|---|---|---|---|---|---|
| | | BD Polymer | FW Scavenger | Condensate Corrosion | Dissolved Oxygen | Gallic Acid Pump Rate | Inert Tracer |
| A | Increased dissolved oxygen <50 ppb | 0 | 1 | 0 | 1 | 1 | 1 |
| B | Increased steam flow | 0 | 0 | 0 | 0 | 1 | 0 |
| C | Oxidizer process contaminant (non-oxygen) | 0/1 | 1 | 0/1 | 0 | 1 | 1 |
| D | UV-Vis absorbing process contaminant | 0 | 1 | 0 | 0 | 1 | 1 |
| E | Loss of product feed | 0 | 1 | 0 | 0 | 1 | -1 |

USE OF CONTROL MATRIX FOR BOILER CONTROL

CROSS-REFERENCE TO RELATED PATENT APPLICATION

This patent application is a continuation-in-part of U.S. patent application Ser. No. 09/563,085, filed May 1, 2000, now U.S. Pat. No. 6,336,058, issued Jan. 1, 2002.

FIELD OF THE INVENTION

This invention is in the field of Boilers and Steam Generating Systems. Specifically, it is in the field of control of boilers.

BACKGROUND OF THE INVENTION

In current industry practice, boilers are controlled in many different ways.

For example, to adjust the amount of boiler water treatment(s) added to minimize boiler corrosion, scale, or other problems, the following methods may be used.

Manual Control of a boiler means that boiler operators will manually change one or more of these items to vary the amount of treatment fed to a boiler: a positive displacement treatment pump stroke length (volume delivered per stroke), frequency of pump stroke (how many strokes per unit of time) for a positive displacement pump, the concentration of treatment active being delivered through a positive displacement pump. Also possible to vary is the selection of entirely different treatment program/product to be fed through the treatment pump(s). A limitation of manual control is that operator intervention and action is required to make a change in the targeted dosage (amount of) treatment added to the boiler.

A limited type of automated control of a boiler is possible using mass flow meters by monitoring the amount of treatment fed to a boiler to the total boiler feedwater or steam mass flow rate and/or by measuring the amount of treatment mass flow rate. The amount of treatment chemical fed to a boiler may be automatically adjusted by changing the treatment pump stroke length and/or by changing the treatment pump stroke frequency. Calibration errors, long-term reliability, and service requirements of mass flow meters in this type of automatic control scheme make it typically less accurate and frequently result in poorer control than with the inert tracer based approach listed above.

U.S. Pat. No. 5,041,386 describes a method involving automated control with an inert tracer through use of a boiler treatment product containing a tracer known to be inert under boiler conditions. With this method the dosage of a treatment may be automatically controlled by feedback or feedforward control of the treatment pump stroke length and/or treatment pump stroke frequency. The use of this inert tracer is the preferred automatic control method of boiler treatment dosage known in practice today.

To adjust the amount of boiler cycles of concentration the following actions may be used: for manual control, boiler operators will manually change one or more of the following items to vary the boiler cycles of concentration (described in U.S. Pat. No. 5,041,386). This method is conducted by using the following operating parameters:

Increase or decrease blowdown mass flow rate by changing the opening of the continuous blowdown valve.

Open the boiler bottom blowdown valve to decrease boiler cycles of concentration. This is almost always a discontinuous operation only done for short periods of time (seconds to minutes in length).

Increase or decrease the continuous blowdown sample flow rate to instruments and/or to the chemical analysis area to control the boiler cycles of concentration For automatic control of a continuously operating boiler in order to adjust the boiler cycles of concentration it is necessary to vary the blowdown mass flow rate. Varying the blowdown mass flow rate is typically done in one of the following ways:

Measure and control blowdown conductivity and/or total dissolved solids continuously and adjust the blowdown valve opening to control the amount of boiler water conductivity. To increase cycles of concentration, the blowdown valve is closed which reduces the continuous blowdown mass flow rate. To decrease the cycles of concentration, the valve is opened which increases the continuous blowdown mass flow rate. The conductivity (or total dissolved solids) may or may not be continuously measured in the boiler feedwater to provide a numeric value of cycles of concentration (blowdown conductivity divided by feedwater conductivity).

Measurement and control blowdown inert tracer concentration (U.S. Pat. No. 5,041,386) continuously by adjusting the blowdown valve opening to control the amount of boiler water tracer concentration is also practiced. To increase cycles of concentration, the blowdown valve is closed which reduces the continuous blowdown mass flow rate. To decrease the cycles of concentration, the valve is opened which increases the continuous blowdown mass flow rate. The tracer concentration may or may not be continuously measured in the boiler feedwater to provide a numeric value of cycles of concentration (B lowdown tracer concentration divided by feedwater tracer concentration).

In some cases, the continuous control of cycles of concentration may be achieved by continuously measuring the blowdown mass flow rate. By comparing this mass flow rate versus the expected (targeted) total boiler feedwater, or by comparison to a continuously measured feedwater mass flow rate, the automatic adjustment of the continuous blowdown valve to control cycles can be achieved. Cycles of concentration is equal to the actual feedwater mass flow rate divided by the blowdown mass flow rate. Unfortunately, the accuracy of mass flow meters make this method many times less accurate in practice than the inert tracer method of automatic control listed above.

New methods of boiler control are always desirable.

SUMMARY OF THE INVENTION

The instant claimed invention is a method of controlling a boiler in which control is based on information from a control Matrix applicable to the specific operating parameters of said boiler comprising:
 (i) providing a suitable fluorometer, sufficient analytical devices and a suitable controller;
 (ii) programming said suitable fluorometer and controller using planning information from a control Matrix for boilers being treated with treatment programs selected from the group consisting of:
  (a) Polymer Based All-in-One Product,
  (b) Residual Phosphate Polymer Product with Scavenger and Condensate Corrosion Inhibitor Fed Separately; and
  (c) pH/Phosphate Product with Polymer, Scavenger, and Condensate Corrosion Inhibitor Fed Separately;
  (d) All-polymer Product with Separate Scavenger and Condensate Corrosion Inhibitor Fed Separately;

(e) pH/Phosphate Polymer Product with Scavenger and Condensate Corrosion Inhibitor Fed Separately;

(iii) using said fluorometer and sufficient suitable analytical devices to determine the status of system factors;

(iv) determining the pattern of changes in the readings from step (iii) over time;

(v) comparing the changes in readings in steps (iii) and (iv), with the patterns listed in the control Matrix to determine what corrective action(s) is recommended; and (vi) using said controller to automatically implement said corrective action(s).

BRIEF DESCRIPTION OF THE DRAWINGS

FIG. 1A and FIG. 1B are a control Matrix showing the control pattern for a boiler being treated with a Polymer Based All-in-One Treatment Product which also contains an oxygen scavenger and condensate corrosion inhibitor.

FIG. 2A and FIG. 2B are a control Matrix showing the control pattern for a boiler being treated with a Residual Phosphate Polymer Product where Scavenger and Condensate Corrosion Inhibitor are Fed Separately.

FIG. 3A and FIG. 3B are a control Matrix showing the control pattern for a boiler being treated with a pH/Phosphate product where the Polymer, Oxygen Scavenger, and Condensate Corrosion Inhibitor are all fed separately. This regime could be applied also applied in boiler water treatment operations as either congruent, coordinated, equilibrium phosphate programs.

FIG. 4A and FIG. 4B are a control Matrix showing the control pattern for a boiler being treated with an All-Polymer Product where the Oxygen Scavenger and Condensate Corrosion Inhibitor are fed separately.

FIG. 5A and FIG. 5B are a control Matrix showing the control pattern for a boiler being treated with a pH/Phosphate Polymer Product where the Oxygen Scavenger and Condensate Corrosion Inhibitor are fed separately. This regime could also be applied in boiler water treatment operations as either congruent, coordinated, equilibrium phosphate programs.

FIG. 6A and FIG. 6B are a control Matrix showing the control pattern for a boiler being treated with a Polymer Based All-in-One product (with (Gallic Acid) Scavenger and Condensate Corrosion Inhibitor fed separately).

FIG. 7 is a plot showing Gallic Acid Product Consumption/Usage Increase Additional Measurements.

DESCRIPTION OF THE PREFERRED EMBODIMENTS

Throughout this patent application the following terms have the indicated definitions:

Aldrich refers to Aldrich Chemical Company, P.O. Box 2060, Milwaukee, Wis., USA 53201, telephone numbers (414) 273-3850 or (800) 558-9160.

Andover refers to Andover Corporation, 4 Commercial Dr., Salem, N.H., USA 03078-2800, telephone number (888) 893-9992.

BD means boiler blowdown (same as boiler water);

Boiler is meant to include the term "steam generation system" as well as boiler;

Boiler cycles means boiler cycles of concentration;

COND means boiler condensate;

Cycles means boiler cycles of concentration;

Fed Separately refers to individual control of each treatment component, not necessarily that the point of addition to the system is separate for each treatment component.

FW means boiler feedwater;

Gallic Acid refers to 3,4,5-trihydroxybenzoic acid. The CAS Registry Number for Gallic Acid is 149-91-7. Gallic Acid is available from Aldrich as the monohydrate, catalog number 39,822-5. Products containing Gallic Acid and base are available from Nalco. Throughout this patent application the term Gallic Acid is meant to include Gallic Acid and also meant to include known hydrates and salts of Gallic Acid and mixtures thereof.

Hydroquinone refers to p-dihydroxybenzene. It is also known as quinol or hydroquinol. The CAS Registry Number for Hydroquinone is 123-31-9. Hydroquinone is available from Aldrich in a 99% solution, catalog number H1,790-2. Throughout this patent application the term Hydroquinone is meant to include Hydroquinone and also meant to include known hydrates and salts of Hydroquinone and mixtures thereof.

Nalco refers to Nalco Chemical Company, One Nalco Center, Naperville, Ill., USA 60563, (630) 305-1000.

psig means pounds per square inch (gauge pressure);

Propyl Gallate refers to Propyl 3,4,5-trihydroxybenzoate, which is also known as Benzoic Acid, 3,4,5-trihydroxy-, propyl ester. The Chemical Abstracts Service Registry Number for the inverted form of propyl gallate is 121-79-9.

3,4-dihydroxybenzhydrazide is also known as 3,4-dihydroxybenzoic acid hydrazide. The Chemical Abstracts Service Registry Number is 39635-11-5.

2-hydroxybenzhydrazide is also known as 2-hydroxybenzoic acid hydrazide. The Chemical Abstracts Service Registry Number is 936-02-7.

4-hydroxybenzhydrazide is also known as 4-hydroxybenzoic acid hydrazide. The Chemical Abstracts Service Registry Number is 5351-23-5.

Salicylal carbohydrazone is also known as carbonic dihydrazide, [(2-hydroxyphenyl)methylene]- or mono (salicylidene)carbohydrazone. The Chemical Abstracts Service Registry Number is 99223-49-1.

Classic tracer for boilers is used to describe the use of an inert fluorescent tracer within a boiler (see U.S. Pat. No. 5,041,386 which describes and claims the use of Classic tracer in boiler systems).

Polymer Based All-in-One Product contains polymer, plus scavenger, plus condensate corrosion inhibitor in one treatment product.

The instant claimed invention is a method of controlling a boiler in which control is based on information from a control Matrix applicable to the specific operating parameters of said boiler comprising:

(i) providing a suitable fluorometer, sufficient analytical devices and a suitable controller;

(ii) programming said suitable fluorometer and controller using planning information from a control Matrix for boilers being treated with treatment programs selected from the group consisting of:

(a) Polymer Based All-in-One Product;

(b) Residual Phosphate Polymer Product with Scavenger and Condensate Corrosion Inhibitor Fed Separately;

(c) ph/Phosphate Product with Polymer, Scavenger, and Condensate Corrosion Inhibitor Fed Separately;

(d) All-polymer Product with Separate Scavenger and Condensate Corrosion Inhibitor Fed Separately; and (e) pH/Phosphate Polymer Product with Scavenger and Condensate Corrosion Inhibitor Fed Separately;

(iii) using said fluorometer and sufficient suitable analytical devices to determine the status of system factors;

(iv) determining the pattern of changes in the readings from step (iii) over time;

(v) comparing the changes in readings in steps (iii) and (iv), with the information listed in the control Matrix to determine what corrective action(s) is recommended; and (vi) using said controller to automatically implement said corrective action(s).

Suitable fluorometers and controllers for use in the instant claimed invention are available from Nalco. One such suitable fluorometer and controller for use in conducting the method of the instant claimed invention is described and claimed in U.S. patent application Ser. No. 09/563,086, entitled, "MODULAR FLUOROMETER AND METHOD OF USING SAME TO DETECT ONE OR MORE FLUOROPHORES", filed May 1, 2000, now U.S. Pat. No. 6,369,894, issued on Apr. 9, 2002, herein incorporated by reference in its entirety. The fluorometer described and claimed therein is capable of measuring anywhere from one to sixteen separate fluorescent signals. The controller described therein is capable of using input from the fluorometer and other analytical devices, process this input according to program and apply control signals to the pumps and valves of a boiler.

When Gallic Acid is used as the Oxygen Scavenger, the preferred fluorometer is a TRASAR® 350 fluorometer, available from Nalco.

The instant claimed method is a method to control a boiler in which control is based on information from a planned matrix applicable to the specific operating parameters of said boiler. FIGS. 1, 2, 3, 4, 5 and 6 detail six specific control matrices and the fundamental logic needed to control a boiler system operating under either a residual phosphate, pH/ phosphate, pH/phosphate with polymer, polymer all-in-one, or all-polymer treatment program. (Figure six is a variant on FIG. 1, both of these treatment programs being a Polymer Based All-In-One Product.) These six example programs would not be fed simultaneously. Rather, only one matrix would be used at one time.

For the example Matrices shown in FIGS. 1–6, conditions negatively impacting boiler or steam generation system performance are listed (items A through L on all plus item M on FIGS. 3 and 5). These Figures all use this code to signify the consumption pattern of the indicated material. Consumption is predicted by the symbol "1", where "0" is listed where no change in consumption should occur. A "−1" symbol is listed for conditions where a decrease in consumption should be noted.

Sufficient analytical devices are the number of analytical devices required to analyze those system factors known to persons of ordinary skill in the art of boilers as being important. Those system factors include, but are not limited to:

pH;
Conductivity;
Oxidation-reduction potential or "ORP";
additional chemical monitors of water quality for such factors including, but not limited to, calcium, magnesium, total hardness, iron, copper, chloride, sulfate, aluminum, silica, alkalinity, ammonia, phosphate, turbidity, total suspended solids; process leaks;
non-fluorescent monitors of treatment actives such as dispersant polymer, molybdate, phosphate and phosphonates;
water temperatures;
process-side temperatures, taken at various places in the system to help determine exchanger efficiency and fouling;
treatment actives;
fluid flowrates;
fluid velocities;
fluid pressures and differential pressures;
chemical inventories and depletion thereof;
pumping rates;
blowdown rates;
makeup water flowrate;
corrosion monitors;
fouling/deposit monitors; and
light absorbance of substances in water.

Analytical devices capable of monitoring the above-described factors are known in the area of boilers and steam generation system.

In FIG. 1, the polymer all-in-one product scheme, Active tracer monitoring would be performed on the BD polymer, FW scavenger, and condensate corrosion treatment. Consumption of each active component of the treatment program would be measured using standard fluorescent tracer analytical techniques (using a sufficient number of fluorometers to measure the fluorescent signal of the inert tracer material (usually identified as "Classic tracer" for boilers) in the feed water and possibly within the condensate sample (s)). By evaluating each of these fluorescent signals and looking up the unique condition on the control matrix, a corrective step for the boiler control system to take would be automatically initiated or a recommendation would be communicated to the boiler operator for those corrective actions requiring manual intervention like maintenance and repair.

In FIG. 2, the residual phosphate polymer product scheme, Active tracer monitoring would be performed on the BD polymer, FW scavenger, BD phosphate, and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

In FIG. 3, the pH/phosphate product with polymer scheme, Active tracer monitoring would be performed on the BD polymer, FW scavenger, BD phosphate and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

In FIG. 4, the All-polymer product scheme, Active tracer monitoring would be performed on the BD polymer, FW scavenger, and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

In FIG. 5, the pH/Phosphate Polymer Product with Scavenger and Condensate Corrosion Inhibitor Fed Separately, Active tracer monitoring would be performed on the BD polymer, FW scavenger, BD phosphate and condensate corrosion treatments. Consumption of each active component of the treatment program would be measured using standard tracer techniques of using a sufficient number of fluorometers to measure the fluorescent signal of the inert tracer material (usually identified as "Classic tracer for boilers") in the feed water and possibly within the condensate sample(s). By evaluating each of these fluorescent signals and looking up the unique condition on the control matrix, a corrective step for the boiler control system to take would be initiated (or recommended for those items requiring manual intervention like maintenance and repair).

The boiler controlled using the matrix of FIG. 6, would have the same control parameters monitored as a boiler being controlled using the matrix of FIG. 1.

Examples of Inert tracer ("Classic tracer for boilers") are 1,5 napthalenedisulfonic acid alkali neutralized, fluorescein, or other fluorometric compound(s) known to be inert under the conditions of a boiler or steam generating system which it is fed to (see U.S. Pat. No. 5,041,386). The fluorescent spectrum of this inert tracer must be distinguishable from any or all other fluorometric species in the boiler. Only one inert tracer (Classic tracer) would be fed to a boiler system at one time. Classic tracer for boilers is available under the trademark TRASAR® from Nalco Chemical Company, One Nalco Center, Naperville, Ill. 60563.

Examples of Actives Monitoring (Actives tracer) in BD is a polymer, capable of acting as a dispersant and/or chelating natural or synthetic polymer. It must be capable of being monitored by fluorometric measurement tools or instruments on a continuous or semi-continuous (repetitive batch monitoring) basis. The fluorescent spectrum of this polymer must be distinguishable from any or all other fluorometric species in the boiler. Actives tracer for boilers is available under the trademark TRASAR® from Nalco. One example of a suitable Actives tracer is described and claimed in U.S. Pat. No. 5,736,405.

FW (feedwater) scavenger is an oxygen scavenger (reductant) capable of reducing dissolved oxygen concentrations found in the boiler system due to incomplete removal by mechanical means (deaeration) or through ingress through leaks, and/or system contamination from returned condensate. This scavenger must be capable of being monitored by fluorometric measurement tools or instruments on a continuous or semi-continuous (repetitive batch monitoring) basis. Suitable oxygen scavengers are selected from the group consisting of Gallic Acid, Hydroquinone, Propyl gallate, 3,4-dihydroxybenzhydrazide, 2-hydroxybenzhydrazide, 4-hydroxybenzhydrazide and salicylal carbohydrazone. Each Oxygen Scavenger requires the fluorometer to have its excitation and emission wavelengths set to match the Oxygen Scavenger. When the Oxygen Scavenger is Gallic Acid, the residual Oxygen Scavenger is detected by setting a fluorometer at about 300 nm excitation and about 370 nm emission. When the Oxygen Scavenger is Hydroquinone, the residual Oxygen Scavenger is detected by setting a fluorometer at about 290 nm excitation and about 325 nm emission. When the Oxygen Scavenger is propyl gallate the residual Oxygen Scavenger is detected by setting a fluorometer at about 320 nm excitation and about 390 nm emission. When the Oxygen Scavenger is 3,4-dihydroxybenzhydrazide the residual Oxygen Scavenger is detected by setting a fluorometer at about 320 nm excitation and about 400 nm emission. When the Oxygen Scavenger is 2-hydroxybenzhydrazide the residual Oxygen Scavenger is detected by setting a fluorometer at about 320 nm excitation and about 430 nm emission. When the Oxygen Scavenger is 4-hydroxybenzhydrazide the residual Oxygen Scavenger is detected by setting a fluorometer at about 290 nm excitation and about 350 nm emission. When the Oxygen Scavenger is salicylal carbohydrazone the residual Oxygen Scavenger is detected by setting a fluorometer at about 330 nm excitation and about 470 nm emission.

For specific types of Oxygen Scavengers, known as Ultimate Oxygen Scavengers, it is possible to monitor the fluorescent signal of both the reduced state (active) of the oxygen scavenger and the different fluorescent signal of the oxidized (spent) form of the scavenger by fluorometers. The fluorescent signals of this scavenger must be distinguishable from any or all other fluorometric species in the boiler.

For further information about the use of the fluorescent signal of oxygen scavengers to control the feed rate of fresh oxygen scavenger, see U.S. patent application Ser. No. 09/737,261, "FLUOROMETRIC CONTROL OF AROMATIC OXYGEN SCAVENGERS IN A BOILER SYSTEM", filed Dec. 13, 2000, now U.S. Pat. No. 6,436,71, which issued on Aug. 20, 2002.

Condensate corrosion treatment is a treatment fed to limit or reduce the amount of corrosion in the steam/condensate system of a boiler. This treatment may or may not be volatile. It may or may not be a neutralizing amine (like cyclohexylamine), filming amine, or other filming inhibitor. However, this treatment would be capable of being monitored by fluorometric measurement tools or instruments on a continuous or semi-continuous (repetitive batch monitoring) basis. The fluorescent spectrum of this corrosion inhibitor must be distinguishable from any or all other fluorometric species in the boiler. Persons of ordinary skill in the art of boilers know condensate corrosion treatment materials.

BD (blowdown—same as boiler water) Phosphate is a phosphate containing treatment fed to minimize mineral scale and/or to form a more easily removable mineral scale; and/or control alkalinity, in a boiler or steam generating system. This treatment would be capable of being monitored by fluorometric measurement tools or instruments on a continuous or semi-continuous (repetitive batch monitoring) basis. The fluorescent spectrum of this phosphate-based treatment must be distinguishable from any or all other fluorometric species in the boiler. Persons of ordinary skill in the art of boilers know Blowdown phosphate materials.

It is known to persons of ordinary skill in the art of boilers that in the cases of the condensate corrosion treatment, FW scavenger, BD polymer, and BD Phosphate any one or all not naturally fluorescent under the conditions of the boiler or a boiler sample may be made fluorescent through the addition of a separate chemicals in the sample stream prior to introduction into a fluorometer. In a boiler system for the condensate corrosion inhibitor, an example of this detection technique can be found in U.S. Pat. No. 5,858,798 for the monitoring of treatment containing a primary neutralizing amine such as cyclohexylamine.

Actives consumption—if less than expected amount of the active component is found in the sample, it is said that the active is being consumed. If more than the expected amount of the active is present, an accumulation of active is noted. In many cases, the use of Classic tracer for boilers is required to determine the expected (target) actives concentration within the FW, Condensate, or Boiler (BD) sample.

The advantage of the matrix method of control is that it provides a comprehensive control scheme for a boiler.

The six boiler control Matrices depicted in FIGS. 1, 2, 3, 4, 5 and 6 cover a significant portion of the possible water treatment scenarios for boiler and steam generation systems. It is likely other treatment programs could be controlled equally as well with variant matrices. One could imagine programs where products fed separately in one case, are combined with other products to reduce the total amount of feed points and feedpumps required. One such example is seen by comparing matrices in FIG. 1 and in FIG. 4. One can also imagine other treatment chemistries not listed by these example matrices having application for improved control by the method/invention described here. Some of these alternative treatments could include chelants, phosphonates, anti-foam chemistries (such as glycol), all-volatile-treatments for corrosion protection not just in the steam/condensate system, alkalinity sources (such as alkali), oxidizing agents (such as nitrate or nitrite), molybdate, treatment programs for copper control and iron control and surfactants.

With regard to the conditions listed in the control Matrices, although these are important conditions to be considered by any control Matrix for boilers, other conditions generally known but seen only in limited types, limited markets, or in limited locales could also be added to these control Matrices with their responses to the actives consumption and Classic tracer concentration plotted.

The following examples are intended to be illustrative of the present invention and to teach one of ordinary skill how to make and use the invention. This example is not intended to limit the invention or its protection in any way.

EXAMPLES

Example 1

Control of Boiler Using Matrix for a Polymer Based All-In-One Product (with Scavenger and Condensate Corrosion Inhibitor)

In a boiler or steam generating system a Polymer Based All-in-One product (with scavenger and condensate corrosion inhibitor) containing a polymer anti-scalant, an oxygen scavenger (reducing agent) and a neutralizing amine is being fed to the boiler system. The treatment also contains an inert tracer (Classic tracer for boilers for product dosage control, diagnostics, and as a reference point, available from Nalco). The boiler system may or may not need additional pH control from the separate feed of a caustic (sodium hydroxide) solution. The boiler system is controlled near or at the following conditions.

| | |
|---|---|
| pH in the boiler blowdown (boiler water) | 11.0 |
| total FW hardness (calcium + magnesium) as $CaCO_3$ | 0.8 ppm |
| total dissolved oxygen in the feedwater | 10 ppb |
| total carbon dioxide load to the steam | 2.0 ppm as $CaCO_3$ |
| boiler cycles of concentration | 20 |
| boiler operating pressure | 250 psig |

The water fed to the boiler also contains silica, "M-alkalinity", and small amounts of other dissolved ions.

The dosage of the treatment and the concentration of active components (polymer, scavenger, and amine) are measured using either a fluorometer or a suitable analytical device. The fluorometer and controller used are the modular fluorometer and controller from U.S. patent application Ser. No. 09/563,086, entitled, "MODULAR FLUOROMETER AND METHOD OF USING SAME TO DETECT ONE OR MORE FLUOROPHORES", filed May 1, 2000, now U.S. Pat. No. 6,369,894, issued on Apr. 9, 2002.

Under typical operating conditions, the dosage of this all-in-one treatment program is controlled by using the inert tracer measurement. The consumption of each active is also measured by comparing the inert tracer concentration and the concentration of the active components.

A system upset occurred where a seal on the high pressure feedwater pump began to fail. Unfortunately, the boiler operators could not detect the failed seal simply by looking at the pump or by any other mechanical observation. The result of the seal failure is the ingress of oxygen into the boiler feedwater system prior to the injection of the feedwater to the boiler. During the upset the following conditions of the tracer and treatment actives measurements are noted.

DAY 1

No change in feedwater or condensate inert tracer concentration,

Increased consumption of the oxygen scavenger seen, and

No change in polymer or condensate consumption is noted.

FIG. 1 lists boiler system stresses where consumption is predicted by the symbol "1", where "0" is listed where no change in consumption should occur. A "−1" symbol is listed for conditions where a decrease in consumption should be noted. The same table lists potential corrective action for the control system to recommend when a particular set of system stresses are noted.

Based on the measured inert tracer and actives concentrations, the system provided a warning to the operators that possible air in-leakage (oxygen ingress) is suspected with the boiler system. This is likely an ingress of less than 50 to 100 ppb since no change in polymer consumption is being seen. The operators and water treatment service company work to find and begin installing additional oxygen monitoring tools to verify the in-leakage problem. In the meantime, the product treatment is increased to provide additional oxygen scavenger. A new baseline for scavenger consumption and tracer dosage is set.

By the next day, the same feedwater pump sealed is failing to even a greater extent letting in even more dissolved oxygen into the feedwater. Once again, the same FIG. 1 is used by the control system to evaluate the new tracer and treatment actives measurements.

DAY 2

No change in feedwater or condensate inert tracer concentration,

Increased consumption of the oxygen scavenger,

No change in condensate consumption is noted, and

An increase in polymer consumption is noted.

Now the polymer is being consumed as evident by the actives measurement. The stress to the boiler system is now changed to indicate an air in-leakage of greater than 100 ppb nominally. The increased dissolved oxygen lead to thermal decomposition of the organic polymer treatment which led to the increased polymer consumption. Loss of polymer means a direct loss of anti-scalant and possible scale deposition on the boiler internal surfaces. Treatment dosage is once again increased to cover for the ever increasing ingress of dissolved oxygen.

Later on this second day, an instrument specifically designed to measure boiler dissolved oxygen concentration is used to determine the oxygen concentration both upstream and downstream of the high pressure feedwater pump. Measurements show in fact that dissolved oxygen is increased by over 100 ppb across the feedwater pump. This confirms the likely seal problem and maintenance to the pump is scheduled.

Several days later once the pump seal is replaced, dissolved oxygen levels decrease to normal values and no stress is found or indicated by the inert tracer and actives measurement/control system. Treatment dosage is returned to the original value as recommended for the standard boiler operating conditions.

As a result of the monitoring/control methods described in this example, significant oxygen corrosion damage to the pre-boiler and possibly even to the boiler itself are avoided through increasing the treatment dosage target. In addition, the monitoring with control method also limited scale formation through recommending a second dosage increase on day #2. The continued failure of the pump seal now threatens the proper dosage of anti-scalant polymer through oxidative thermal decomposition. This is compensated for by the second dosage increase. In addition, the controller communicates with maintenance personnel and provides them with assistance to identify the nature of the problem. This allows for timely completion of needed repairs and for the treatment dosage to be returned to its normal target value.

Example 2

Control of Boiler Using Matrix for an Oxygen Scavenger Fed Separately from a Condensate Corrosion Inhibitor and an All-Polymer Product In a boiler or steam generating system an oxygen scavenger, condensate corrosion inhibitor and polymer product is fed to the boiler system. The treatments may or may not contain an inert tracer (Classic tracer for boilers for product dosage control, diagnostics, and as a reference point, available from Nalco). The boiler system may or may not need additional pH control from the separate feed of caustic (sodium hydroxide) solution. The boiler system is controlled near or at the following conditions.

| | |
|---|---|
| pH in the boiler blowdown (boiler water) | 11.0 |
| total FW hardness (calcium + magnesium) as $CaCO_3$ | 0.8 ppm |
| total dissolved oxygen in the feedwater | 10 ppb |
| total carbon dioxide load to the steam as $CaCO_3$ | 2.0 ppm |
| boiler cycles of concentration | 20 |
| boiler operating pressure | 250 psig |

The water fed to the boiler also contains silica, "M-alkalinity", and small amounts of other dissolved ions. The dosage of the polymer treatment is measured using either a fluorometer (if an inert tracer has been added to the product) or suitable analytical method and/or device. The dosage of the condensate corrosion inhibitor is measured using either a fluorometer (if an inert tracer has been added to the product) or suitable analytical method and/or device.

Gallic Acid is monitored and controlled in the boiler feedwater on a continuous basis using the fluorescent characteristics of the molecule. The characteristic spectra of Gallic Acid changes as a function of its oxidation state, with the fluorescent spectra of the reduced or active state being separate and distinguishable from the oxidized or reacted spectra and the spectra of any other fluorescent species in the boiler. Gallic Acid residual is defined as the concentration of the reduced or active form of Gallic Acid. Concentrations of the reduced state may be stated in the future as Gallic Acid "residual".

Example 2A

A system upset occurs where the steam injection nozzle in the deaerator becomes obstructed. Steam supply to the deaerator is reduced, resulting in a loss of efficiency in the mechanical removal of oxygen.

The result of the obstructed nozzle is the ingress of oxygen into the boiler feedwater system prior to the injection of the feedwater to the boiler. During the upset, the following conditions or tracer and treatment actives measurements are noted:

Increase in dissolved oxygen (45 ppb) in the deaerator prior to Gallic Acid injection Decrease in the Gallic Acid "residual" concentration in the feedwater No change in feedwater or condensate inert tracer concentration No change in polymer or condensate treatment consumption Refer to FIG. 6, Condition E for the above conditions. The Gallic Acid dosage is increased to treat the dissolved oxygen and maintain the desired "residual" concentration. Days later the following conditions are evident:

Increase in dissolved oxygen (>100 ppb) in the deaerator prior to Gallic Acid injection Decrease in the Gallic Acid "residual" concentration in the feedwater No change in feedwater or condensate inert tracer concentration No change in condensate treatment consumption Increase in polymer consumption Refer to FIG. 4, Condition F for the above conditions. The conditions indicate to the plant personnel that the mechanical deaearation has been compromised. The magnitude of the oxygen ingress is so large such that the required oxygen scavenger feed rate is beyond the capacity of the feedpump. The polymer is consumed by oxidative decomposition. Inspection of the deaerator reveals the obstructed nozzles. Once the nozzles are replaced, designed mechanical deaeration and Gallic Acid feed rates are returned to normal.

Example 2B

A situation arises when the Gallic Acid feed pump becomes air bound after a new delivery of the product. The following conditions are evident:

No Gallic Acid "residual" concentration in the feedwater

No increase in the dissolved oxygen in the deaerator prior to Gallic Acid injection No change in feedwater or condensate inert tracer concentration No change in polymer or condensate treatment consumption Refer to FIG. 4, Condition A for the above conditions. The site glass at the side of the Gallic Acid feed tank shows that the tank is full. No increase in Gallic Acid "residual" is found after multiple attempts of increasing the Gallic Acid feed pump speed.

Product draw down rates at the elevated feed pump speeds show that no product is being delivered to the system. An attempt to prime the feed pump shows that the pump is air bound. The pump is primed with Gallic Acid product and the pump is set back to the initial speed. Gallic Acid "residual" concentrations subsequently return back to normal.

Example 3

A plant experiences reduced production and steam demand drops significantly. Gallic Acid "residual" and oxidized product concentrations are monitored using inherent fluorescent signals, with the "residual" signal used to control Gallic Acid product dosage. The following conditions are observed:

No change in the Gallic Acid "residual" concentration in the feedwater

No change in feedwater or condensate inert tracer concentration

No change in polymer or condensate treatment consumption

Increased Gallic Acid product usage

Two-fold increase in Gallic Acid oxidized product concentration

Refer to FIG. 6, Condition O for the above conditions. Further investigation shows that the dissolved oxygen concentration in the deaerator has increased above 100 ppb. Significantly lowering the system steam demand forced the deaerator to run at lower than designed capacity. Feedwater flow rates below design specifications will not atomize properly through the spray nozzles and cause poor deaerator performance. Steam demand is resumed to deaerator designed specifications and Gallic Acid product usage returns to normal.

Example 4

Defining Gallate Scavenger Consumption

Conditions E, M, N in FIG. 6 exhibit the same treatment actives consumption pattern (i.e. no change for BD polymer and Condensate corrosion inhibitor, consumption for FW scavenger). Reasons for Gallic acid scavenger consumption and/or increased product usage can be defined further in the following five ways:

1) Ratio of the pump rate or % output and the Gallic acid "residual" fluorescence
2) Ratio of the pump rate or % output and the Gallic acid reacted product fluorescence
3) Ratio of an inert tracer concentration and the Gallic acid "residual" fluorescence.
4) Ratio of an inert tracer concentration and the Gallic acid reacted product fluorescence
5) Ratio of the Gallic acid "residual" fluorescence and the Gallic acid reacted product fluorescence The inert tracer would be a product additive.

FIG. 7 gives a table of conditions that could indicate Gallic acid scavenger consumption and/or increased product usage. Three additional measurements can be used to indicate the source of the consumption and/or usage. These measurements are:

1) Dissolved oxygen measurement in the FW while Gallic acid product feed is off.
2) Gallic acid product pump rate.
3) Inert tracer concentration in the FW Corrective actions for process contamination, either from a non-oxygen chemical oxidizer or ultraviolet/visible spectrum absorber, would be the same; dumping the contaminated condensate and searching for process leaks.

Example 2 above shows how one of the additional measurements from above, dissolved oxygen measurement, further diagnosed the condition of increased product usage.

These examples are intended to be illustrative of the present invention, and to teach one of ordinary skill how to make and use the invention. These examples are not intended to limit the invention or its protection in any way.

What is claimed is:

1. A method of controlling a boiler in which control is based on information from a control Matrix applicable to the specific operating parameters of said boiler comprising:
    (i) providing at least one fluorometer, one or more analytical devices and a controller;
    (ii) programming said at least one fluorometer and controller using planning information from a control Matrix for boilers being treated with treatment programs selected from the group consisting of:
        (a) Polymer Based All-in-One Product;
        (b) Residual Phosphate Polymer Product with Scavenger and Condensate Corrosion Inhibitor Fed Separately;
        (c) pH/Phosphate Product with Polymer, Scavenger, and Condensate Corrosion Inhibitor Fed Separately;
        (d) All-Polymer Product with Separate Scavenger and Condensate Corrosion Inhibitor Fed Separately; and
        (e) pH/Phosphate Polymer Product with Scavenger and Condensate Corrosion Inhibitor Fed Separately;
        wherein, in each of these treatment programs the Scavenger is selected from the group of oxygen scavengers consisting of Gallic Acid, Hydroquinone, Propyl gallate, 3,4-dihydroxybenzhydrazide, 2-hydroxybenzhydrazide, 4-hydroxybenzhydrazide and salicylal carbohydrazone;
    (iii) using said at least one fluorometer and said one or more analytical devices to determine the status of system factors;
    (iv) determining the pattern of changes in the readings from step (iii) over time;
    (v) comparing the changes in readings in steps (iii) and (iv), with the patterns listed in the control Matrix to determine what corrective action(s) is recommended; and
    (vi) using said controller to automatically implement said corrective action(s).

2. The method of claim 1 in which said Scavenger is Gallic acid.

3. The method of claim 2 in which said treatment program is a Polymer Based All-in-One Product treatment program. The method of claim 2 in which said treatment program is a Residual Phosphate Polymer Product with Scavenger and Condensate Corrosion Inhibitor Fed Separately.

4. The method of claim 2 in which said treatment program is a pH/Phosphate Product with Polymer, Scavenger, and Condensate Corrosion Inhibitor fed Separately.

5. The method of claim 2 in which said treatment program is an All-Polymer Product with Separate Scavenger and Condensate Corrosion Inhibitor Fed Separately.

6. The method of claim 2 in which said treatment program is a pH/Phosphate Polymer Product with Scavenger and Condensate Corrosion Inhibitor Fed Separately.

7. The method of claim 2 in which said at least one fluorometer is a Modular Fluorometer.

* * * * *